United States Patent [19]

Nakane et al.

[11] 3,864,427

[45] Feb. 4, 1975

[54] MOLDING COMPOSITIONS

[75] Inventors: Ryuichi Nakane, Kobe; Hisatsugu Minamida, Osaka, both of Japan

[73] Assignee: Takeda Chemical Industries, Ltd., Osaka, Japan

[22] Filed: Oct. 26, 1972

[21] Appl. No.: 301,246

[30] Foreign Application Priority Data
Nov. 1, 1971 Japan................................ 46-86924
Oct. 7, 1972 Japan................................ 47-13412

[52] U.S. Cl................................ 260/862, 260/40 R
[51] Int. Cl............................................ c08f 43/08
[58] Field of Search........................... 260/862, 40 R

[56] References Cited
UNITED STATES PATENTS
2,700,185    1/1955    Lee ........................................ 18/59

2,757,160    7/1956    Anderson............................... 260/40
3,441,535    4/1969    Beacham et al. ..................... 260/40
3,503,921    3/1970    Souza et al. .......................... 260/40
3,709,777    1/1973    Takikawa et al. ................... 161/232

Primary Examiner—William H. Short
Assistant Examiner—E. A. Neilson
Attorney, Agent, or Firm—Wenderoth, Lind & Ponack

[57] ABSTRACT

Molding composition containing (1) a crystalline styrene polymer or a copolymer of styrene and a low molecular weight compound containing two non-conjugated ethylenically unsaturated double bonds per molecule, (2) an unsaturated polyester and (3) a monomer which contains one vinyl group and is polymerizable with the unsaturated polyester.

21 Claims, No Drawings

MOLDING COMPOSITIONS

The present invention relates to an improved molding composition, which is based on an unsaturated polyester. The molding composition of this invention shows a sufficient low-shrinking property in the course of molding, and gives molded articles having of a satisfactory affinity to coating compositions. Moreover, the viscosity of the composition is easily increased to a suitable degree by a thickener, and thus, the molding composition of the present invention can easily be preformed into a bulk molding compound (BMC) or sheet molding compound (SMC). It has been known that a composition consisting of an unsaturated polyester, a polymerizable monomer, a curing catalyst, a mold-release agent, a filler, a colorant, a reinforcing material, etc. is, after increasing its viscosity by means of, for example, addition of a suitable thickener, etc., preformed into a suitable form such as doughs, pellets, rods, belts, and sheets. Thus preformed materials have been known as bulk molding compound (BMC) or sheet molding compound (SMC). These preformed materials can be molded into desired shapes under conventional conditions of heat and pressure by means of compression, extrusion, transfer, injection or other molding techniques. Merits of using the SMC or BMC on manufacturing molded articles are found in that the SMC and BMC are extremely manageable materials and can provide greater freedom in molding design and superior workabilities in cutting, weighing, etc. as compared with other molding compositions or materials.

However, as one of fatal defects of the SMC and BMC, particularly those based on unsaturated polyester resin, is that they tend to shrink in the course of their molding step so that the reinforcing materials used are exposed to the extent that the smoothness of the surface of the molded articles is sacrificed. Hitherto, in order to improve or remove this defect, thermoplastic polymers such as methyl methacrylate, polystyrene, cellulose acetate butyrate, polyethylene, polypropylene, saturated polyesters obtained from propylene glycol and adipic acid or sebacic acid, and polyvinyl acetate are co-employed together with the unsaturated polyesters.

However, the molding compositions containing the thermoplastic polymer as mentioned above still have the following drawbacks: A) Because the molding compositions show only insufficient viscosity even if a thickener is employed, a phase separation between the thermoplastic polymer used and the unsaturated polyester is observed and thus, a homogeneous molding resin composition cannot be obtained. In addition, the molding compositions containing such a resin component remain sticky for a rather long period of time. B) In the molded articles prepared from these molding compositions, scumming of the thermoplastic polymer on the surface of the articles is brought about. C) Low-shrinking property of these molding compositions is still insufficient. D) The molded articles prepared from these molding compositions are unsatisfactory in respect to affinity to coating compositions, and therefore, when a coating composition is applied on the molded article prepared from these molding compositions, the appearance of the coated layer is poor and not homogeneous and the layer shows poor physical properties.

Under these circumstances, the present inventors have conducted extensive studies for the purpose of providing a molding composition of SMC or BMC type, which is free from such drawbacks as mentioned above. And finally, the present inventors have quite unexpectedly found that this object can be attained when a crystalline styrene polymer or a copolymer of styrene and a low molecular weight compound containing two non-conjugated ethylenically unsaturated double bonds in a molecule is co-employed together with the unsaturated polyester resin.

More particularly, the present inventors have found that a molding composition containing a crystalline styrene polymer or a copolymer of styrene and a low molecular compound weight containing two non-conjugated ethylenically unsaturated double bonds in a molecule, an unsaturated polyester and styrene monomer shows sufficient viscosity by the addition of a thickener and does not undergo a phase separation between the resin components, but gives a homogeneous resin composition; a molding composition based on such resin components as above is not sticky and is quite manageable; such a molding composition as above shows a satisfactory low-shrinking property in the course of its molding process; a molded article manufactured from such a molding composition as above shows a satisfactory affinity to coating compositions.

The present invention was accomplished on the basis of these findings. Thus, the principal and essential object of the present invention is to provide a molding composition, particularly in the form of SMC or BMC, based on an unsaturated polyester, whose viscosity is easily increased to a suitable degree by a thickener, and which shows a satisfactory low-shrinkage property in the course of its molding process and gives a molded article showing a satisfactory affinity to coating compositions. The molding composition of the present invention is that containing (A) resin components, (B) a polymerizable monomer, (C) a reinforcing material, (D) a thickener and (E) a curing catalyst, which is characterized in that the said resin components (A) comprises an unsaturated polyester and a crystalline styrene polymer or a copolymer of styrene and a low molecular weight compound containing two non-conjugated ethylenically double bonds in a molecule.

The crystalline styrene polymer in the present invention means a styrene polymer showing so-called stereo-tacticity, i.e. styrene polymer in which molecule the styrene units are regularly arranged. Such polymer has also been called isotactic polystyrene.

With respect to the crystalline polystyrene or isotactic polystyrene, "Kobunshi-kagaku"(Journal of Polymer Science) published by The Society of Polymer Science Japan, Vol. 15 (1958), p. 49 ("Polymerization reactions of styrene with Ziegler's catalyst system" by Noboru Yamazaki) may be referred to as a literature reference.

In the present invention, the crystalline polystyrene is not necessary to show complete crystallinity, i.e. to show complete isotacticity or stereo-tacticity, but use is preferably made of crystalline polystyrene such that about 95 weight parts or higher of the polymers is insoluble in methyl ethyl ketone at 40°C, and the insoluble portions melt or soften at about 210° to about 230°C. The crystalline styrene polymers of the present invention include crystalline styrene homopolymer and crystalline copolymers of styrene with one or more lower olefins (e.g. ethylene, propylene, etc.).

An amount of the crystalline styrene polymer to be used is generally about 1 to about 30, preferably about 3 to about 30, more preferably, about 3 to about 15 weight parts relative to 100 weight parts of an unsaturated polyester. The upper limit of the amount is not critical, although when the crystalline styrene polymer is used in too great an excess, it is difficult to mix homogeneously the crystalline styrene polymer, which is powderly at room temperature, with an unsaturated polyester resins, and, moreover, the desired low-shrinking property of the unsaturated polyester is sometimes spoiled. Therefore, it is recommended to employ not more than about 30 weight parts of the crystalline styrene polymer relative to 100 weight parts of the unsaturated polyester.

Alternatively, a copolymer of styrene and a low molecular weight compound containing two non-conjugated ethylenically unsaturated double bonds in a molecule is employed in the present invention.

The low molecular weight unsaturated compound employable in preparing the copolymer is exemplified by those represented by the following general formula (I),

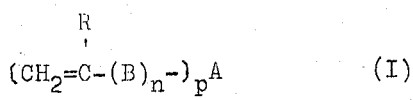

wherein A represents a bivalent radical of

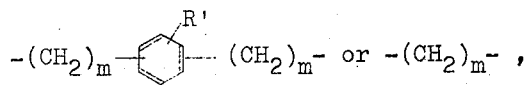

wherein R' represents a hydrogen atom or a methyl group, and $m$ is an integer of 0 or 1, or a trivalent low molecular weight hydrocarbon radical, B represents a bivalent radical of

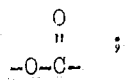

R represents a hydrogen atom or a methyl group; $n$ is an integer of 0 or 1; and $p$ is an integer of 2 or 3.

The typical examples of the trivalent low molecular weight hydrocarbon radical shown by A are those containing 3 to 6 carbon atoms, which are exemplified by

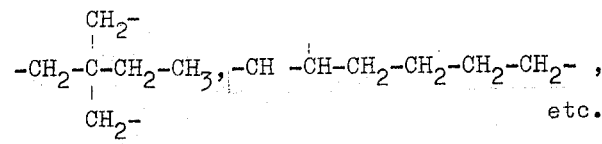

As the compounds represented by the general formula (I), there may be mentioned divinyl benzene derivatives (e.g. divinyl benzene, divinyl toluene); alkylene glycol diacrylate or alkylene glycol dimethacrylate derivatives (e.g. ethylene glycol diacrylate, ethylene glycol dimethacrylate), diallyl phthalate, glycerine triacrylate, glycerine trimethacrylate, trimethylol propane triacrylate, trimethylol propane trimethacrylate, 1,2,6-hexanetriol triacrylate, 1,2,6-hexanetriol trimethacrylate, etc.

The copolymer is prepared by copolymerizing styrene and the compound of the above general formula (I) in a conventional manner, for example, the method described in "Highpolymers" published by Wiley Interscience Co., New York, Vol. 9 (1955), p. 18 ("Emulsion polymerization" by F. A. Bovey et al). An amount of the compound of the general formula (I), which is to be used for the production of the copolymer, is about 0.2 to about 30%, more preferably, from about 0.5 to about 10% relative to styrene.

When the amount of the compound of the general formula (I) is used in an amount not more than about 0.2%, the solubility of the resulting copolymer in styrene monomer increases to an undesired extent and, on the contrary, when more than about 30% is used, it is difficult to swell the resulting copolymer with styrene monomer. In any event, sufficient low-shrinking property of the desired object molding composition can not be obtained.

Thus obtained copolymer has a net-work structure which is produced by cross-linking of styrene polymer unit with the compound of the general formula (I).

In the production of the copolymer, a part of styrene may be replaced by other copolymerizable monomer. As the copolymerizable monomers, any of compounds having one vinyl group in a molecule may be used, which are exemplified by vinyl acetate; acrylic acid, methacrylic acid or their derivatives such as esters (e.g. methyl acrylate, methyl methacrylate), amides (e.g. acrylamide, methacryl amide) or nitriles (e.g. acrylonitrile, methacrylonitrile), etc.

When one or more of these other copolymerizable monomers are employed together with styrene, although the amount of these monomers varies with the desired property of the resulting molded articles, it is recommended to employ not more than about 30 weight parts of these monomers, more particularly, about 10 to about 20 weight parts, relative to 100 weight parts of styrene from the practical point of view.

An amount of the copolymer to be used in the present molding composition is generally about 3 to about 20, more preferably, about 5 to about 10 weight parts relative to 100 weight parts of an unsaturated polyester. With respect to the desired low-shrinking property of the resulting molding composition, the upper limit of the amount is not critical, although when the copolymer is employed in too great excess, the viscosity of the resulting resin components increases to an undesired extent, and the workability of the resulting resin component becomes poor. Therefore, it is recommended to employ not more than about 20 weight parts of the copolymer relative to 100 weight parts of an unsaturated polyester.

Moreover, for the purpose of accomplishing the object of the present invention, conventional styrene polymer or copolymer may be employed in the preparation of the resin composition (A) together with the copolymer of styrene and the compound of the general formula (I) in such a ratio of conventional styrene polymer or copolymer to the copolymer of about 0.5 to about 3 (weight/weight).

The unsaturated polyesters employable in the present invention may be any of the unsaturated polyesters which can be produced by a conventional ester condensation of an $\alpha,\beta$-unsaturated aliphatic dicarboxylic acid or a mixture of the dicarboxylic acid and a saturated aliphatic dicarboxylic acid or/and aromatic dicarboxylic acid with a polyol. Generally, to minimize the shrinkage of the desired molded articles, as the unsaturated polyesters, those having high reactivity are preferable. Thus, it is desirable to employ an unsaturated polyester which is obtainable by reacting at least about 70 mole % of an α,β-unsaturated aliphatic acid and about 0 to about 30 mole % of a saturated dicarboxylic acid or/and an aromatic dicarboxylic acid with a polyol. Depending on purposes, however, unsaturated polyesters whose unsaturated aliphatic dicarboxylic acid content is about 50 mole % may be employable.

As the α,β-unsaturated alphatic acid employable in the preparation of the unsaturated polyesters according to this invention, there may be mentioned maleic acid, maleic anhydride, fumaric acid and itaconic acid; as the saturated aliphatic dicarboxylic acid, there may be mentioned succinic acid, adipic acid and sebacic acid; and as the aromatic dicarboxylic acid, there may be mentioned phthalic acid, phthalic anhydride, isophthalic acid, terephthalic acid, trimellitic acid and the like. As the polyol employable in the preparation of the unsaturated polyesters, there may be mentioned low molecular alkylene diols such as ethylene glycol, diethylene glycol, propylene glycol, dipropylene glycol, neopentyl glycol, 1,3-butandiol, 1,4-butandiol, 1,3-propanediol, 1,5-pentanediol, 1,6-hexanediol, cyclohexanedimethanol and 2,2,4-trimethyl-1,3-pentanediol, hydrogenated bisphenol, an adduct of bisphenol A to propylene oxide; triols such as trimethylolpropane and glycerine; or a suitable mixture thereof. With respect to the thickening behaviour of the molding composition based on the unsaturated polyester, the acid value of the unsaturated polyester is preferably about 10 to about 70, more preferably about 20 to about 50.

In the practice of this invention, more satisfactory low-shrinkage results are at some times obtained by employing a polyester component which is a mixture of the said unsaturated polyester and a saturated polyester whose acid component is an aromatic dicarboxylic acid such as isophthalic acid or terephthalic acid. When the said saturated polyester is employed, an amount of the saturated polyester is optional insofar as there will be no phase separation of the saturated polyester as added in the desired molding composition. For a practical purpose, an amount of the saturated polyester is generally about 1 to about 30 weight parts relative to 100 parts of the unsaturated polyester.

The polymerizable monomer (B) employable in the present invention may be any of monomers having one vinyl group in a molecule, which is polymerizable with an unsaturated polyester. As the monomer, there may be mentioned styrene derivatives (e.g. styrene, α-chlorostyrene, t-butyl styrene); lower alkyl esters of acrylic acid or methacrylic acid (e.g. methyl acrylate, methyl methacrylate); vinyltoluene; diallyl esters (e.g. diallyl phthalate, diallylisophthalate); triallyl cyanurate, triallyl isocyanurate; or a suitable mixture thereof. An amount of the polymerizable monomer (B) is generally about 10 to about 70, more preferably about 30 to to about 50 weight parts relative to 100 weight parts of the unsaturated polyester.

The curing catalyst (E) employable in the present invention may be any of catalysts generally employable for curing unsaturated polyesters. As the catalyst, there may be mentioned organic peroxides such as benzoyl peroxide, t-butylperbenzoate, t-butyl peroctoate, cyclohexanone peroxide, lauroyl peroxide, cumene hydroperoxide and the like. An amount of the curing catalyst (E) is generally about 0.1 to about 3 weight parts relative to 100 weight parts of the total amount of the unsaturated polyester and polymerizable monomer (B).

The thickener (D) employable in the present invention may be any of thickeners generally employable in the thickening of a molding composition containing an unsaturated polyester and a polymerizable monomer. As the thickener, there may be mentioned oxides or hydroxides of alkaline earth metals such as magnesium oxide, magnesium hydroxide, calcium oxide, calcium hydroxide and beryllium oxide; zinc oxide; zinc hydroxide or a suitable mixture thereof. An amount of the thickener (D) is generally about 0.1 to about 20 weight parts relative to 100 weight parts of the total amount of unsaturated polyester and polymerizable monomer (B).

The reinforcing material (C) employable in the present invention may be any of reinforcing materials which are generally employable in the manufacture of molded articles based on unsaturated polyester. As the reinforcing material, there may be mentioned glass fiber, carbon fiber, synthetic fiber such as vinylon fiber, nylon fiber or natural fiber such as hemp. The amount of the reinforcing material (C) varies with the desired property of molded articles and is generally about 20 to about 120, more preferably about 50 to about 100 weight parts relative to 100 weight parts of the total amount of unsaturated polyester and polymerizable monomer (B).

The resin components (A) of the present invention are prepared by mixing homogeneously the unsaturated polyester and the crystalline styrene polymer or the copolymer of styrene and the compound of the general formula (I).

Thus, it is recommended to employ the crystalline styrene polymer or the copolymer of styrene and a compound of the general formula (I) in a pulverized state. It is also recommended to obtain fine particles of the copolymer of styrene and the compound of the general formula (I) by emulsion polymerization, i.e. at first by emulsifying styrene monomer and the compound of the general formula (I) in a suitable solvent (e.g. water) with a suitable emulsifying agent (e.g. sodium dodecylbenzene sulfonate, lauryl sulfate), and then by subjecting the resulting emulsion to polymerization in the presence of a conventional catalyst (e.g. potassium persulfate).

The molding composition of the present invention may be prepared by any of the methods which are conventionally employable in the manufacture of SMC or BMC, for example, by adding a curing catalyst (E) and a thickener (D) to a resin composition consisting of resin components (A) and a polymerizable monomer (B), and then impregnating the resulting composition with a reinforcing material (C) before the viscosity of the resulting composition increases to a great extent. In preparing the molding composition as above, if required, a suitable amount of a filler (e.g. inorganic filler such as calcium carbonate, clay, aluminum oxide), internal lubricant (e.g. zinc stearate, calcium stearate) pigment and the like may be added. Amounts of such filler, internal lubricant and pigment depend upon the properties of the desired molding compositions and the resulting molded articles.

The present molding composition thus produced can be preformed into doughs, pellets, rods or belts, which are known as bulk molding compound (BMC), or into the form of sheets, which are known as sheet molding compound (SMC) and stored as such. When the molding composition is to be stored in the form of sheets, i.e. as SMC, both sides of each preformed sheet may be covered with suitable films such as films of polyethylene, polypropylene or cellophane, for instance, and the films may be peeled off just before putting the compound to use.

The molding composition of the present invention in such an optional form can be molded by a suitable molding method such as compression, extrusion, transfer or injection molding.

The following description pertains to the procedures which may be followed when the molding composition of the present invention preformed into a sheet is molded by compression molding.

First the sheet of the molding composition is weighed and cut into pieces of suitable size, which are then placed in position on a mold, which corresponds to the shape of the desired molded articles, and is coated with mold-release agent. Then, the preformed sheet is molded, usually desirably under the pressure of about 30 to about 100 kg/cm$^2$ and at the temperature of about 110 to about 160°C for about 1 to about 30 minutes.

By using the molding composition of the present invention, there can be obtained a molded article which is free from internal cracks, protrusion of the reinforcing material used and the scumming of various additives used, and which has satisfactory dimensional stability, and whose surfaces are glossy and smooth and show high affinity to coating compositions.

The following Experiments are further illustrative of the present invention. In the following Experiments, the word "part(s)" is based on weight unless otherwise noted and the relationship between "part(s)" and "volume part(s)" corresponds to that between "gram" and "milliliter".

EXPERIMENT

A. Preparation of Crystalline Styrene Polymer

In 20 volume parts of n-hexane, 2.3 parts of triethyl aluminum and 1.15 part of titanium tetrachloride are mixed to prepare a catalyst. This catalyst is added to 20 volume parts of refined styrene monomer, and the resulting mixture is heated in a sealed vessel at 80°C for 8 hours. The vessel is opened and the reaction mixture is allowed to flow into methanol to deactivate the catalyst. The resulting precipitate is washed with dilute hydrochloric acid and water and, after drying, it is further washed with methyl ethyl ketone to remove the portion soluble in methyl ethyl ketone. Upon drying, 7 parts of a powdery product having a molecular weight of about 50,000 to 200,000 (by ebullioscopy with p-xylene) is obtained. Using a differential calorimeter (manufactured by Rigaku Denki Corp. in Japan), the above powder is subjected to thermal analysis. A major peak of heat absorption is observed in the neighborhood of 220°C, indicating that the above temperature is the melting point of the above powder.

Furthermore, there is entirely no glass transition phenomenon in the neighborhood of 82°C, which is encountered in the case of ordinary polystyrene, attesting to the fact that this product is an isotactic polystyrene. This product is referred to as Resin(A-1).

B. Preparation of a Copolymer of Styrene Monomer and a Compound of the General Formula (I)

To a mixture of 1.5 part of sodium dodecylbenzene sulfonate, 0.1 part of sodium pyrophosphate and 150 volume parts of water are added 99 parts of styrene monomer and 0.55 part of divinylbenzene, then the resulting mixture is stirred at 55°C for 10 hours in nitrogen gas stream. It is observed by an electro microscope that an average diameter of granules of the resulting product is about 0.1 $\mu$.

The reaction mixture is kept standing at room temperature in a plate for one day to give an extremely breakable flake-like product (softening point: 115°C). This product is referred to as Resin (A-2).

After a similar manner to the above, the following Resins are produced;

| Starting product | Resulting resin, which is referred to as follows | |
|---|---|---|
| 98 parts of styrene monomer<br>1.1 part of divinylbenzene | Resin(A-3) | softening point (°C)<br>120 |
| 95 parts of styrene monomer<br>2.75 parts of divinylbenzene | Resin(A-4) | 120 |
| 90 parts of styrene monomer<br>5 parts of methyl methacrylate<br>2.75 parts of divinylbenzene | Resin(A-5) | 115 |
| 90 parts of styrene monomer<br>4.4 parts of divinylbenzene | Resin(A-6) | 120 |
| 85 parts of styrene monomer<br>5 parts of methyl methacrylate<br>5 parts of acrylic acid<br>2.75 parts of divinylbenzene | Resin(A-7) | 115 |
| 85 parts of styrene monomer<br>5 parts of methyl methacrylate<br>5 parts of methacrylic acid<br>2.75 parts of divinylbenzene | Resin(A-8) | 115 |
| 70 parts of styrene monomer<br>20 parts of methyl methacrylate<br>5 parts of methacrylic acid<br>2.75 parts of divinylbenzene | Resin(A-9) | 125 |
| 85 parts of styrene monomer<br>5 part of methyl methacrylate<br>5 parts of methacrylic acid<br>5 parts of ethylene glycol dimethacrylate | Resin (A-10) | 115 |
| 87 parts of styrene monomer<br>5 parts of methyl methacrylate<br>5 parts of methacrylic acid<br>3 parts of trimethylol propane trimethyacrylate | Resin(A-11) | 115 |

C. Preparation of an Unsaturated Polyester

1. In nitrogen gas streams, 1161 parts of fumaric acid and 837 parts of propylene glycol are heated at 200°C for about 9 hours to obtain a polyester having an acid value of 30 and a molecular weight of 2000. To 100 parts of this polyester is added 0.01 part of hydroquinone, and the resulting mixture is dissolved in 55 parts of styrene monomer to obtain a liquid unsaturated polyester resin. This liquid product is referred to as Resin (B).

2. In nitrogen gas streams, 441 parts of maleic anhydride, 814 parts of phthalic anhydride and 837 parts of propylene glycol are heated at 200°C for about 8 hours to obtain a polyester having an acid value of 35 and a molecular weight of 1500. 100 Parts of the above polyester is added 0.01 part of hydroquinone, and the resulting mixture is dissolved in 45 parts of styrene monomer to obtain a liquid unsaturated polyester.

This product is referred to as Resin (C).

D. Preparation of a Saturated Polyester

In nitrogen gas streams, 2306 parts of isophthalic acid, 424 parts of 1,3-butylene glycol and 1141 parts of diethylene glycol are heated at 220°C for about 17 hours to obtain a saturated polyester having an acid value of 49, a hydroxyl value of 35.6 and a molecular weight of 2500. To 100 parts of the above polyester is added 0.01 part of hydroquinone and the resulting mixture is dissolved in 50 parts of styrene monomer to prepare a liquid saturated polyester.

This product is referred to as Resin (D).

E. Preparation of Solution of Polystyrene

Under moderate heating, 50 parts of Styren (polystyrene manufactured by Asahi Dow. Corp. in Japan) is dissolved in 50 parts of styrene monomer. The resulting product is referred to as Resin (E).

F. Preparation of Resin Composition

The resin compositions (1)–(16) and the control compositions (17) to (27) are prepared by mixing the above Resins (A-1) to (A-11), (B) to (E) in such a ratio as described in the following Table (1):

Table (1)

| Resin Compositions / Ingredients | present invention | | | | | | | | | | | | | | | | control | | | | | | | | | | |
|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
| Resin (A-1) | 15 | 10 | | | | | | | | | | | | | | | | | | | | | | | | | |
| Resin (A-2) | | 10 | | | | | | | | | | | | | | | | | | | | | | | | | |
| Resin (A-3) | | | 15 | | | | | | | | | | | | | | | | | | | | | | | | |
| Resin (A-4) | | | | 5 | | | | | | | | | | | | | | | | | | | | | | | |
| Resin (A-5) | | | | | 8 | | | | | | | | | | | | | | | | | | | | | | |
| Resin (A-6) | | | | | | 8 | | | | | | 5 | | | | | | | | | | | | | | | |
| Resin (A-7) | | | | | | | 10 | | | | | | 5 | | | | | | | | | | | | | | |
| Resin (A-8) | | | | | | | | 7 | | | | | | 5 | | | | | | | | | | | | | |
| Resin (A-9) | | | | | | | | | 7 | | | | | | 5 | | | | | | | | | | | | |
| Resin (A-10) | | | | | | | | | | 5 | | | | | | 5 | | | | | | | | | | | |
| Resin (A-11) | | | | | | | | | | | 5 | | | | | | | | | | | | | | | | |
| Resin (B) | 70 | 70 | 70 | 70 | 60 | 60 | 60 | 60 | 60 | 60 | 70 | 70 | 70 | 70 | 70 | 70 | 100 | 65 | 65 | 70 | 70 | 70 | | 65 | 70 | 70 | 70 |
| Resin (C) | | 10 | | | | | | 10 | | | | | | | | | | 35 | 35 | | | | | 35 | | | |
| Resin (D) | | | | | | | | | | | | | | | | | | | | | 30 | 20 | | | | | 20 |
| Resin (E) | | | | | | | | | | | | | | | | | | | | | | 10 | 100 | | | | 10 |
| *styrene solution of polyacrylic ester | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| t-Butyl perbenzoate | 90 | 90 | 90 | 90 | 90 | 90 | 90 | 90 | 90 | 90 | 90 | 90 | 90 | 90 | 90 | 90 | 90 | 90 | 90 | 90 | 90 | 90 | 90 | 90 | 90 | 90 | 90 |
| Calcium carbonate | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | | | 1.5 | | | 1.5 | | 1.5 | | |
| Magnesium hydroxide | 15 | 10 | 15 | 25 | 32 | 32 | 30 | 33 | 33 | 30 | 25 | 25 | 25 | 25 | 25 | 25 | | | | | | | | | | | |
| Magnesium oxide | | | | | | | | | | | | | | | | | | 2 | 1 | | 2 | 2 | | 2 | | | |
| Styrene monomer | | | | | | | | | | 5 | | | | | | | | | | 15 | | | | | 15 | 30 | 20 |
| Polyethylene powder | | | | | | | | | | | | | | | | | | | | 15 | | | | | 15 | | 10 |
| **Styrene polymer | | | | | | | | | | | | | | | | | | | 35 | | | | | | | | |
| BHT | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |

G. Test of the Compatibility of the Resin, the Shrinkage and the Affinity to Coating Composition With respect to the above compositions (1) to (27), the compatibility of resins produced by Experiments (A) to (D) in these compositions and the shrinkage and the affinity to coating composition of the molded articles made from these compositions are compared with one another. The results are described in the following Table (2).

Table (2)

| Compositions | | Shrinkage of molded articles (%) | Phase separation of the resins | Affinity to coating compositions of molded articles |
|---|---|---|---|---|
| present invention | 1 | 0.1* | Not observed | Good |
| | 2 | 0* | Not observed | Good |
| | 3 | 0.3* | Not observed | Good |
| | 4 | 0.2 | Not observed | Good |
| | 5 | 0 | Not observed | Good |
| | 6 | 0.1 | Not observed | Good |
| | 7 | 0 | Not observed | Good |
| | 8 | 0.1 | Not observed | Good |
| | 9 | 0.1 | Not observed | Good |
| | 10 | 0 | Not observed | Good |
| | 11 | 0.1 | Not observed | Good |
| | 12 | 0.4 | Not observed | Good |
| | 13 | 0 | Not observed | Good |
| | 14 | 0.3 | Not observed | Good |
| | 15 | 0.1 | Not observed | Good |
| | 16 | 0.3 | Not observed | Good |
| control | 17 | 2.2, 2.2* | Not observed | — |
| | 18 | 0.4 | Observed | — |
| | 19 | 1.0* | Not observed | — |
| | 20 | 0.1* | Not observed | Poor |
| | 21 | 0.7 | Observed | Good |
| | 22 | 0.7, 1.2* | Observed | Good |
| | 23 | 2.2 | Not observed | Good |
| | 24 | 0.4 | Observed | Good |
| | 25 | 0.1 | Not observed | Poor |
| | 26 | 0.7 | Observed | Good |
| | 27 | 1.2 | Observed | Good |

(Notes)
1) The phase separation of resins in each of the above composition is observed after 3 days' storage at 40°C in a glass container.
2) The shrinkage of molded articles is obtained by molding each composition using a disc-type mold, 50 mm diameter, and 3 mm thick, at 150°C for 30 minutes, measuring the diameter of the resulting molded articles with a dial gauge and calculating the rate of shrinkage.
3) "*" denotes the rate of shrinkage of the molded articles obtained by molding the composition which has been stored at 40°C for 3 days.
4) The affinity to coating compositions of the molded article is evaluated by the following procedure. Each molded article is cleansed with toluene and, then, sprayed with a melamine-alkyd baking paint.("Amilac No.1" manufactured by Kansai-paint Co., Japan). The coated product is allowed to stand for 10 minutes, after which time it is baked and cured at 140°C for 30 minutes. Then, the coating surface of the product is crisscrossed with a knife edge and, at the intersection of the incisions, the presence or absence of a rising of the coating and the ease or difficulty with which the coating film can be peeled off are observed.

H. Manufacture of Sheet Molding Compounds (SMC) and Bulk Molding Compound (BMC)

1. 25 Parts of a nonwoven fabric of glass fiber is impregnated with 50 parts of the above resin composition (1) prepared in Experiment (F) to obtain a sheet of about 2mm thick. Either surface of the sheet is covered with a polyethylene film. This product is referred as SMC(1). After a similar manner to the above, the following sheet molding compounds are produced from the corresponding resin compositions:

| Resin composition prepared in Experiment (F) | Resulting sheet molding compounds, which are referred as follows |
|---|---|
| Resin composition 4 | SMC (2) |
| Resin composition 7 | SMC (3) |
| Resin composition 8 | SMC (4) |

2. 12.5 Parts of chopped strand of glass fiber, 50 parts of the resin compositions (10) prepared in Experiment (F) and 100 parts of calcium carbonate are mixed by a mixing mill and then preformed in the form of dough. This product is referred as BMC (1).

(I) Manufacture of Molded Articles

Thus prepared SMC (1) to (4) and BMC (1) are stored in a glass container at 40°C for 3 days. The SMC (1) to (4) are such that the polyethylene film can be easily peeled off and substantially none of the resin adheres to the films. These SMC (1) to (4) and BMC (1) are cut to size respectively and, using a disc-shaped mold, cured and molded at 50 kg/cm² and 140°C for 5 minutes to obtain the following disc-shaped molded articles (1) to (5), which are 40 mm in diameter and about 3 mm thick.

| Molding composition | Molded articles |
|---|---|
| SMC (1) | Molded article (1) |
| SMC (2) | Molded article (2) |
| SMC (3) | Molded article (3) |
| SMC (4) | Molded article (4) |
| BMC (1) | Molded article (5) |

J. Test of Shrinkage, Affinity to Coating Composition

The shrinkage and the affinity to coating composition of the resulting Molded articles (1) to (5) are tested by a procedure similar to those described in Experiment (G). The results are described in the following Table (3):

Table (3)

| Molded articles | Shrinkage (%) | Affinity to coating composition | Appearance of the surface |
|---|---|---|---|
| 1 | 0 | Good | Glossy and satisfactory |
| 2 | 0 | Good | Glossy and satisfactory |
| 3 | 0 | Good | Glossy and satisfactory |
| 4 | 0 | Good | Glossy and satisfactory |
| 5 | 0 | Good | Glossy and satisfactory |

What we claim is:

1. A molding composition comprising (1) an unsaturated polyester produced by reacting an α,β-unsaturated aliphatic dicarboxylic acid, or a mixture of the dicarboxylic acid and at least one of a saturated aliphatic dicarboxylic acid and an aromatic dicarboxylic acid, with a polyol, (2) a monomer polymerizable with the unsaturated polyester and having one vinyl group per molecule, and (3) a crystalline styrene polymer in which at least about 95 weight parts of the polymer is insoluble in methyl ethyl ketone at 40°C, and the insoluble portions of the polymer melt or soften at about 210° to about 230°C, or a copolymer of (a) styrene or a mixture of styrene and a monomer copolymerizable therewith and having one vinyl group per molecular and (b) a low molecular weight compound containing two non-conjugated ethylenically unsaturated double bonds per molecule.

2. A molding composition comprising (1) an unsaturated polyester produced by reacting an α,β-unsaturated aliphatic dicarboxylic acid, or a mixture of the dicarboxylic acid and at least one of a saturated aliphatic dicarboxylic acid and an aromatic dicarboxylic acid, with a polyol, (2) a monomer polymerizable with the unsaturated polyester and having one vinyl group per molecule, (3) a crystalline styrene polymer in which at least about 95 weight parts of the polymer is insoluble in methyl ethyl ketone at 40°C, and the insoluble portions of the polymer melt or soften at about 210° to about 230°C, (4) a reinforcing material, (5) a thickener and (6) a curing catalyst.

3. A molding composition comprising (1) an unsaturated polyester produced by reacting an α,β-unsaturated alphatic dicarboxylic acid, or a mixture of the dicarboxylic acid and at least one of a saturated aliphatic dicarboxylic acid and an aromatic dicarboxylic acid, wtih a polyol, (2) a monomer polymerizable with the unsaturated polyester and having one vinyl group per molecule, (3) a copolymer of (a) styrene or a mixture of styrene and a monomer copolymerizable therewith and having one vinyl group per molecule and (b) a low molecular weight compound containing two non-conjugated ethylenically unsaturated double bonds per molecule, (4) a reinforcing material, (5) a thickener and (6) a curing catalyst.

4. A molding composition claimed in claim 2, wherein the weight ratio of the crystalline styrene polymer/the unsaturated polyester is about 1/100 to about 30/100.

5. A molding composition claimed in claim 2, wherein the weight ratio of the crystalline styrene polymer/the unsaturated polyester is about 3/100 to about 30/100.

6. A molding composition claimed in claim 2, wherein the weight ratio of the crystalline styrene polymer/the unsaturated polyester is about 3/100 to about 15/100.

7. A molding composition claimed in claim 3, wherein the low molecular weight compound is a compound represented by the formula;

$$(CH_2=C-(B)_n-)_p A$$
$$\phantom{(CH_2=C-}{}^{R}$$

wherein A represents a bivalent radical of

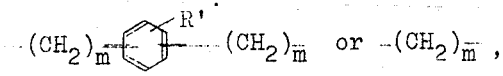

wherein R' represents a hydrogen atom or a methyl group and m is an integer of 0 or 1, or a trivalent low molecular weight hydrocarbon radical, B represents a bivalent radical of $$-O-\overset{O}{\underset{\|}{C}}-,$$

R represents a hydrogen atom or a methyl group, n is an integer of 0 or 1 and p is an integer of 2 or 3.

8. A molding composition claimed in claim 7, wherein the trivalent low molecular weight hydrocarbon radical is a hydrocarbon radical having 3 to 6 carbon atoms.

9. A molding composition claimed in claim 8, wherein the hydrocarbon radical having 3 to 6 carbon atoms is a hydrocarbon radical of

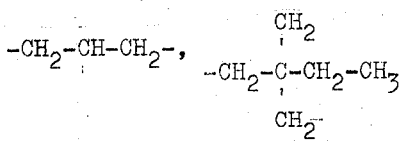

or

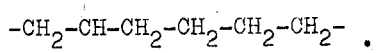

10. A molding composition claimed in claim 7, wherein the copolymer of styrene and the low molecular weight compound is prepared by copolymerizing styrene with about 0.2 to about 30% of the low molecular weight compound based on the weight of the styrene.

11. A molding composition claimed in claim 7, wherein the copolymer of styrene and the low molecular weight compound is prepared by copolymereizing styrene with about 0.5 to about 10% of the low molecular weight compound based on the weight of the styrene.

12. A molding composition claimed in claim 3, wherein the low molecular weight compound is divinyl member selected from the group consisting of divinyl benzene, divinyl toluene, ethylene glycol diacrylate, ethylene glycol dimethacrylate, diallyl phthalate.

13. A molding composition claimed in claim 12, wherein the low molecular weight compound is divnyl benzene.

14. A molding composition claimed in claim 3, wherein the mixture of styrene and a monomer copolymerizable therewith and having one vinyl group per molecule is used in preparing the copolymer.

15. A molding composition claimed in claim 14, wherein the copolymerizable monomer is a member selected from the group consisting of acrylic acid, methacrylic acid, methyl acrylate, methyl methacrylate and mixtures thereof.

16. A molding composition claimed in claim 11, wherein the weight ratio of the copolymer/the unsaturated polyester is about 3/100 to about 20/100.

17. A molding composition claimed in claim 9, wherein the weight ratio of the copolymer/the unsaturated polyester is about 5/100 to about 10/100.

18. Sheet molding compound prepared by preforming the molding composition claimed in claim 6.

19. Bulk molding compound prepared by preforming the molding composition claimed in claim 6.

20. Sheet molding compound prepared by preforming the molding composition claimed in claim 17.

21. Bulk molding compound prepared by preforming the molding composition claimed in claim 17.

* * * * *